United States Patent
Nomura et al.

(10) Patent No.: US 12,347,029 B2
(45) Date of Patent: Jul. 1, 2025

(54) TAGGING VIRTUAL ELEMENTS IN PROXIMITY TO USER DEVICE

(71) Applicant: Niantic, Inc., San Francisco, CA (US)

(72) Inventors: Tatsuo Nomura, Singapore (SG); Chihiro Kanno, Kawasaki (JP); Hiroki Asakawa, Tokyo (JP)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 18/644,523

(22) Filed: Apr. 24, 2024

(65) Prior Publication Data

US 2024/0362858 A1    Oct. 31, 2024

(30) Foreign Application Priority Data

Apr. 25, 2023   (SG) .......................... 10202301152W

(51) Int. Cl.
| | |
|---|---|
| *G06T 17/00* | (2006.01) |
| *G06T 13/40* | (2011.01) |
| *G06V 20/70* | (2022.01) |

(52) U.S. Cl.
CPC .............. *G06T 17/00* (2013.01); *G06T 13/40* (2013.01); *G06V 20/70* (2022.01)

(58) Field of Classification Search
None
See application file for complete search history.

(56) References Cited

U.S. PATENT DOCUMENTS

| | | | |
|---|---|---|---|
| 2004/0070681 A1* | 4/2004 | Battles | H04N 23/634 |
| | | | 348/333.01 |
| 2013/0271488 A1 | 10/2013 | Stirbu et al. | |
| 2017/0041319 A1* | 2/2017 | Barrett | G06F 21/645 |
| 2019/0022530 A1* | 1/2019 | Kornmann | H04W 4/02 |
| 2019/0180506 A1* | 6/2019 | Gebbie | G06T 19/00 |
| 2020/0043233 A1 | 2/2020 | Nelson et al. | |
| 2020/0117267 A1* | 4/2020 | Gibson | G06F 3/011 |
| 2020/0193717 A1* | 6/2020 | Daly | H04L 9/3297 |
| 2020/0242818 A1 | 7/2020 | Liu et al. | |
| 2020/0376369 A1* | 12/2020 | Reddan | G10L 15/1815 |
| 2021/0228988 A1* | 7/2021 | Franceus | A61B 5/0022 |
| 2021/0379484 A1 | 12/2021 | Golden et al. | |
| 2022/0305385 A1 | 9/2022 | Konno et al. | |
| 2024/0053820 A1* | 2/2024 | Adcock | G06F 3/011 |

OTHER PUBLICATIONS

PCT International Search Report and Written Opinion, PCT Application No. PCT/IB2024/054044, Aug. 30, 2024, eight pages.

* cited by examiner

*Primary Examiner* — Anh-Tuan V Nguyen
(74) *Attorney, Agent, or Firm* — Fenwick & West LLP

(57) ABSTRACT

A parallel-reality application enables users to tag virtual elements in their proximity for later interaction. A geographic location of a user is received and used to identify a virtual location, in a virtual world, that maps to the geographic location of the user. A region of the virtual world is identified based on the identified virtual location and one or more virtual elements within the region of the virtual world are selected. An identifier of the one or more virtual elements is stored in conjunction with an identifier of the user and a list of tagged virtual elements is provided for display to the user. At a later time, the user interacts with a selected one of the tagged virtual elements.

18 Claims, 7 Drawing Sheets

TAGGING VIRTUAL ELEMENTS IN PROXIMITY TO USER DEVICE

BACKGROUND

This application claims the right of priority based on Singapore application no. 10202301152W, filed Apr. 25, 2023, which is incorporated by reference.

BACKGROUND

1. Technical Field

The subject matter described relates generally to parallel-reality worlds, and, in particular, to tagging virtual elements in parallel-reality worlds enabling user to interact with the tagged virtual elements remotely at a later time.

2. Problem

Parallel-reality applications provide a virtual world that has a geography that maps to at least a portion of the real-world. A user navigates the virtual world by moving around in the real world. In conventional parallel-reality applications, users can only interact with virtual elements in their proximity when an application for interacting with the virtual world is open on the user's client device. When the application is not open and in the foreground of the display of the user's client device, the user is unaware of the virtual elements around them. Thus, the user may miss opportunities to engage with virtual elements in the virtual world.

SUMMARY

The present disclosure describes approaches to tagging virtual elements in a parallel-reality application based on proximity to a user. Tagged virtual elements may later be interacted with remotely by the user. In one embodiment, virtual elements may be tagged when the user is not using the parallel-reality application. A background process monitors the location of the user's client device and reports the client device's location to a parallel-reality application server when one or more conditions are met (e.g., if the location has changed by a threshold amount since a previous location was sent to the server, if the location has changed from one geofenced area to another, or if more than a threshold amount of time has passed since a previous location was sent to the server). The server tags one or more virtual elements within proximity to the location of the client device (e.g., within a predetermined distance of the location or within the same geofenced area as the location). The user may later be presented with an opportunity to interact with tagged items within the parallel-reality application, regardless of the current location of the user's client device.

In one embodiment, when the server receives a location of a client device of a user, it tags one or more virtual elements in proximity of the client device (assuming a taggable virtual element exists in proximity of the client device). When the server receives an updated location of the client device, indicating the client device has moved a significant distance since the previously received location (either because the client device has moved a predetermined distance or because the user has entered a different geofenced area), the server tags an additional one or more virtual elements in proximity of the new location of the client device (again assuming a taggable virtual element exists within proximity of the new location). Thus, as the user moves around in the world, the server may tag virtual elements each time the user moves a predetermined distance or transitions from one ringfenced region to another.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel-reality game that includes augmented reality content in a virtual world geography that parallels at least a portion of the real-world geography such that player movement and actions in the real-world affect actions in the virtual world. The subject matter described is applicable in other situations where providing remote interaction with virtual elements is desirable. In addition, the inherent flexibility of computer-based systems allows for a great variety of possible configurations, combinations, and divisions of tasks and functionality between and among the components of the system.

Example Location-Based Parallel-Reality Game

Figure 1:
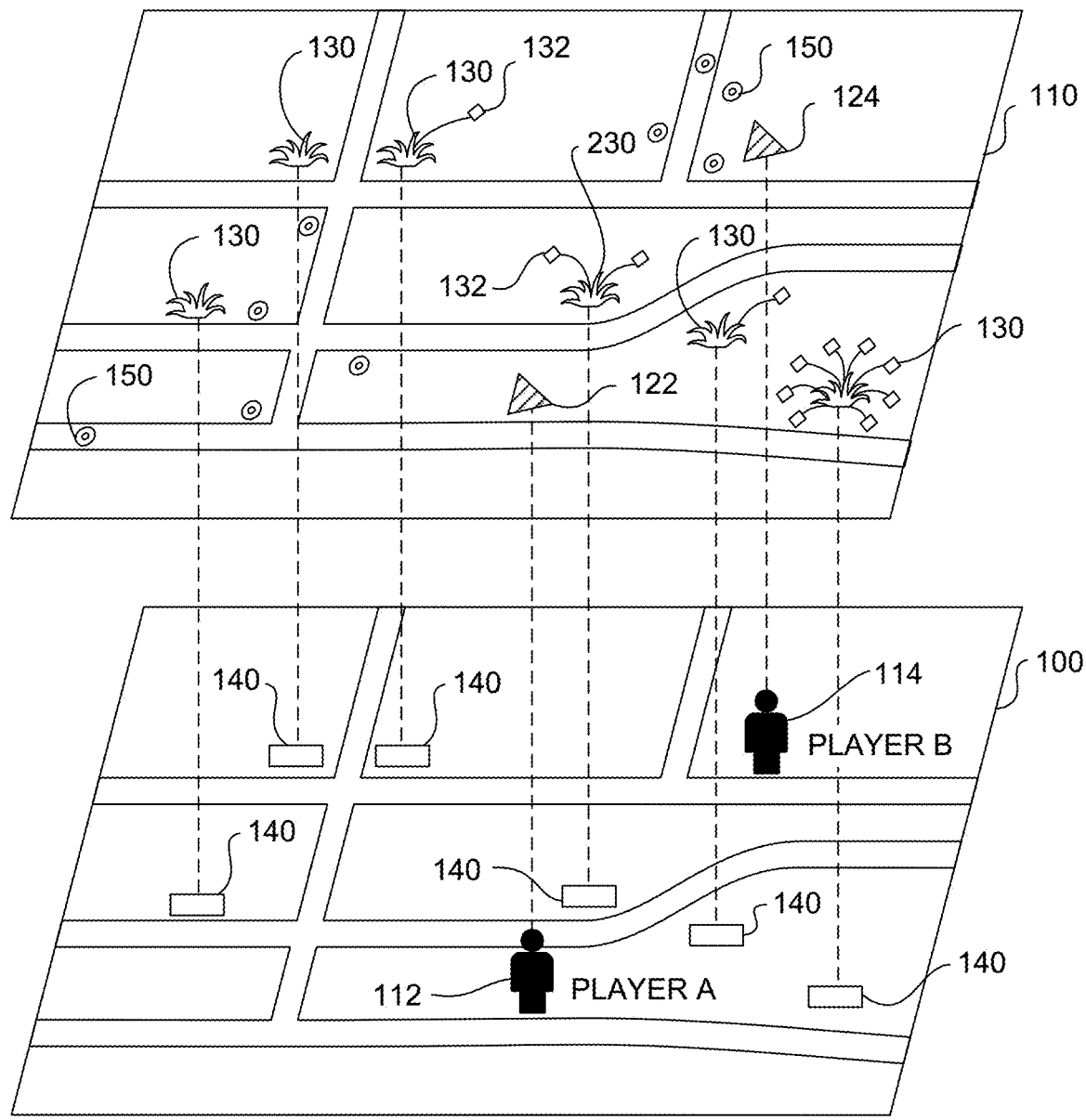
FIG. 1 depicts a representation of a virtual world having a geography that parallels the real world, according to one embodiment.

FIG. 1 is a conceptual diagram of a virtual world 110 that parallels the real world 100. The virtual world 110 can act as the game board for players of a parallel-reality game or users of other parallel-reality applications. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g., weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may gather virtual energy as part of the parallel-reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel-reality game can be a massive multi-player location-based game where every participant in the game shares the same virtual world. The players can be divided into separate teams or factions and can work together to achieve one or more game objectives, such as to capture or claim ownership of a virtual element. In this manner, the parallel-reality game can intrinsically be a social game that encourages cooperation among players within the game. Players from opposing teams can work against each other (or sometime collaborate to achieve mutual objectives) during the parallel-reality game. A player may use virtual items to attack or impede progress of players on opposing teams. In some cases, players are encouraged to congregate at real world locations for cooperative or interactive events in the parallel-reality game. In these cases, the server seeks to ensure players are indeed physically present and not spoofing their locations.

Figure 2:
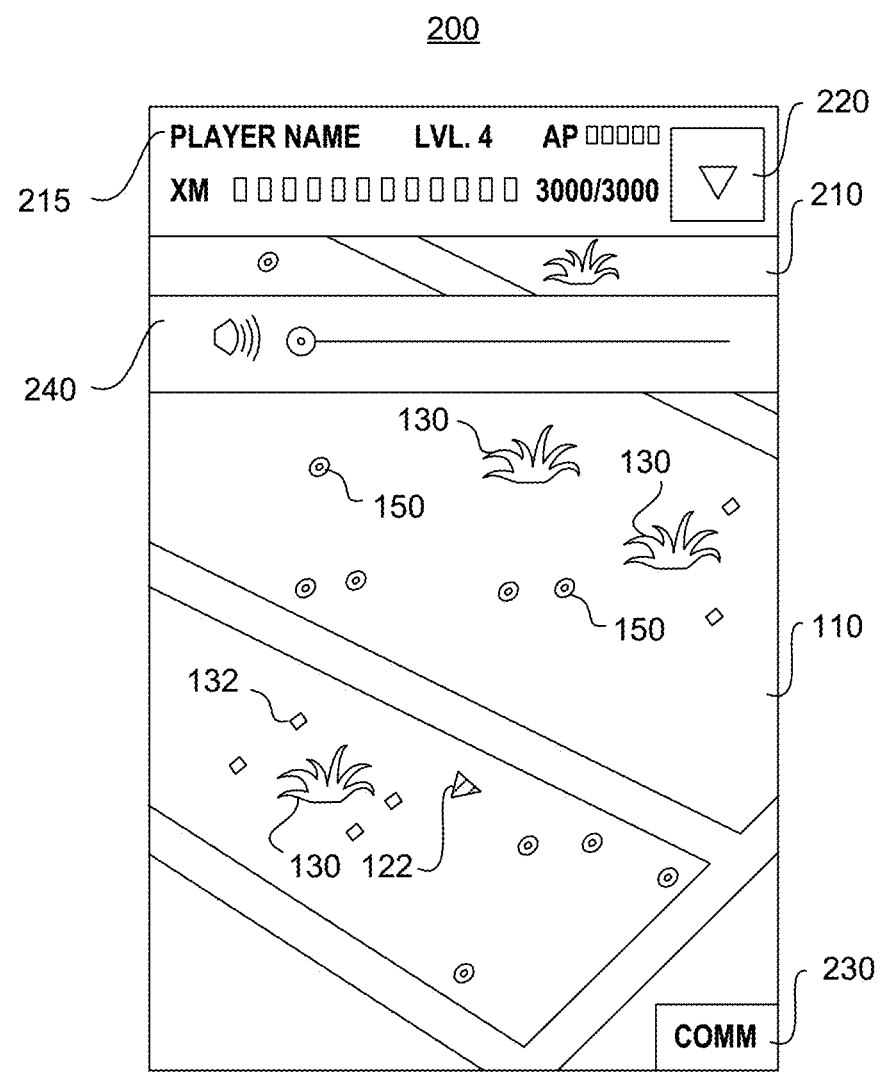
FIG. 2 depicts an exemplary game interface of a parallel-reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel-reality game.

According to aspects of the present disclosure, a player can interact with the parallel-reality game by carrying a client device around in the real world. For instance, a player can play the game by accessing an application associated with the parallel-reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel-reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel-reality game can have various features to enhance and encourage game play within the parallel-reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Parallel-Reality System

Figure 3:
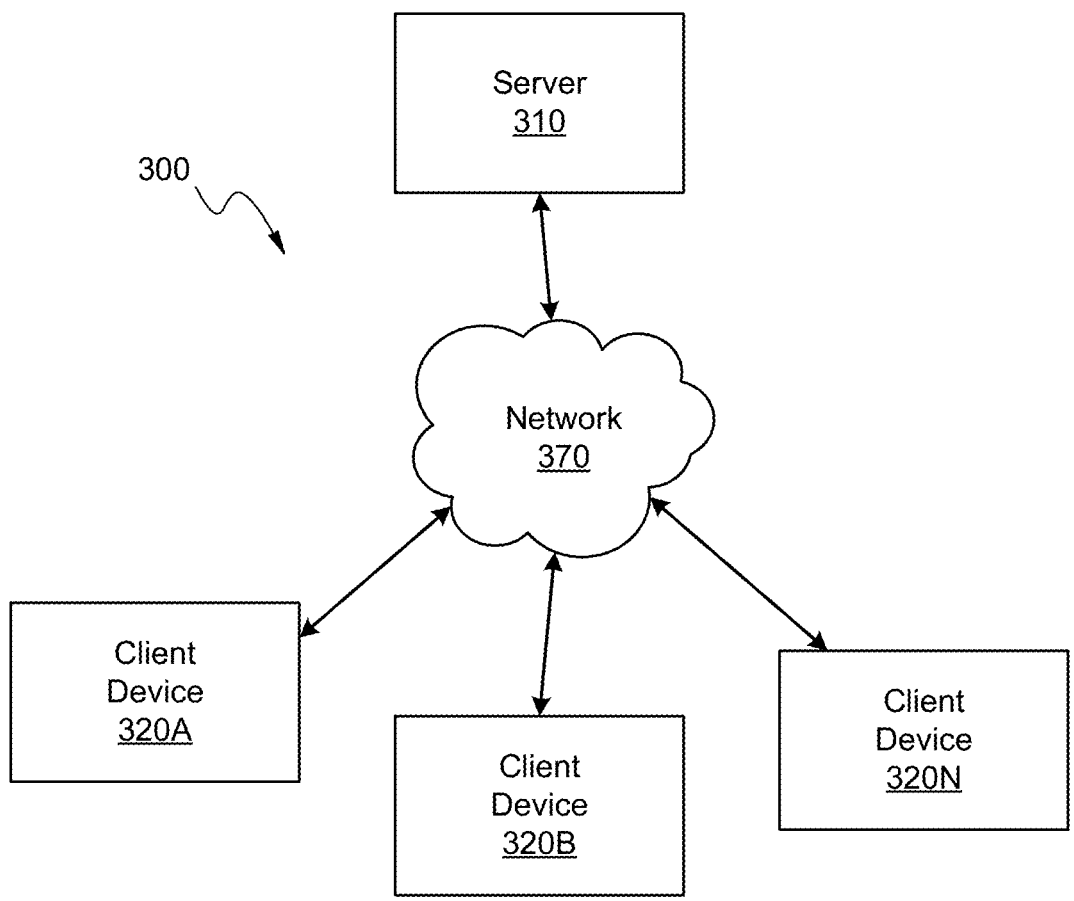
FIG. 3 is a block diagram of a networked computing environment suitable for providing tagging of virtual elements, according to one embodiment.

FIG. 3 illustrates an embodiment of distributed parallel-reality system 300. The parallel-reality system 300 provides for the interaction of users in a virtual world having a geography that parallels the real world. In particular, a geographic area in the real world can be linked or mapped directly to a corresponding area in the virtual world. A user can move about in the virtual world by moving to various geographic locations in the real world. The system 300 can track a user's position in the real world and update the user's position in the virtual world based on the user's current position in the real world. For example, a coordinate system in the real world (e.g., longitude and latitude) may be mapped to a coordinate system in the virtual world (e.g., x/y coordinates, virtual longitude and latitude, etc.).

In the embodiment shown in FIG. 3, the distributed parallel-reality system 300 includes a server 310 and client devices 320 connected via a network 370. Although three client devices 320 are shown, any number of client devices can be connected to the server 310 via the network 370. In other embodiments, the distributed parallel-reality system 300 includes different or additional elements. Furthermore, the functions may be distributed among the elements in a different manner than described.

The server 310 includes one or more computing devices that provide application functionality to the client device 320. In one embodiment, the server 310 hosts a universal state of a location-based game and provides game status updates to players' client devices 320 (e.g., based on actions taken by other players in the game, changes in real-world conditions, changes in game state or condition, etc.). The server 310 receives and processes input from players in the location-based game. Players may be identified by a username or player ID (e.g., a unique number or alphanumeric string) that the players' client devices 320 send to the server 310 in conjunction with the players' inputs.

For example, the server 310 may receive a request from a client device 320 for a corresponding player to perform an in-game action. The request may include an identifier of the player and information about the requested action, such as the identity of an object with which the player wishes to interact and the nature of the requested interaction (e.g., pick up, drop, capture, upgrade, etc.). The server 310 may determine the outcome and return a game update to the client device based on the determined outcome. The server 310 also receives real-world activity data from players' client devices 310 and determines in-game outcomes based on the real-world activity data. The server 310 may also notify players (e.g., via a push notification) of certain in-game outcomes resulting from the real-world activity data. Various embodiments of the server 310 are described in greater detail below, with reference to FIG. 5.

A client device 320 can be any portable computing device capable for use by a player to interface with the server 310. For instance, a client device 320 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 320 may be a less-mobile device such as a desktop or a laptop computer. Furthermore, the client device 320 may be a vehicle with a built-in computing device.

A client device 320 may execute software (e.g., a gaming application or app) to allow a player to interact with the virtual world. A client device 320 may execute a background process that periodically or in response to certain trigger events provides location information to the server 310. The server 310 may use the location information to tag virtual elements that are in proximity (e.g., within a threshold distance) of the client device 320 and the software may later enable the user to interact with the tagged virtual elements remotely (i.e., without requiring the client device to be in proximity with the virtual elements when the interaction occurs). The software may also enable the user to tag virtual elements in proximity of the client device manually and provide later remote interaction with the manually tagged virtual elements. Various embodiments of client device 320 are described in greater detail below, with reference to FIG. 4.

The network 370 can be any type of communications network, such as a local area network (e.g., an intranet), wide area network (e.g., the internet), or some combination thereof. The network can also include a direct connection between a client device 320 and the server 310. In general, communication between the server 310 and a client device 320 can be carried via a network interface using any type of wired or wireless connection, using a variety of communication protocols (e.g., TCP/IP, HTTP, S1v1TP, FTP), encodings or formats (e.g., HTML, JSON, XML), or protection schemes (e.g., VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Client Device

Figure 4:
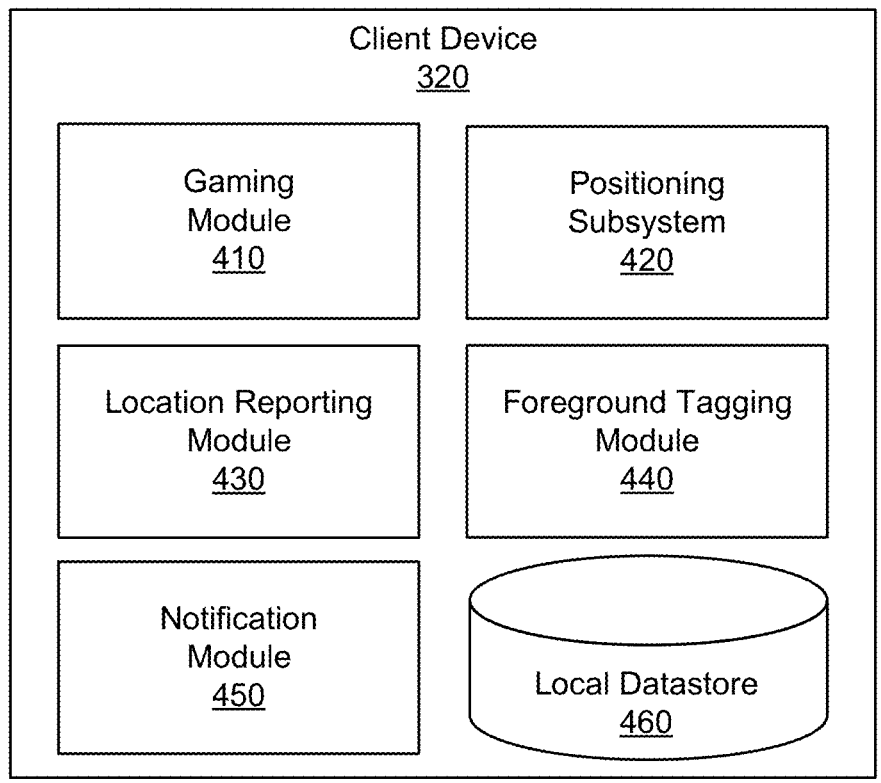
FIG. 4 is a block diagram of a client device shown in FIG. 3, according to one embodiment.

FIG. 4 illustrates one embodiment of a client device 320 suitable for use as part of a distributed parallel-reality system 300. In the embodiment shown, the client device 320 includes a gaming module 410, a positioning subsystem 420, a location reporting module 430, a foreground tagging module 440, a notification module 450, and a local data store 460. In other embodiments, the client device 320 contains different or additional elements. In addition, the functions may be distributed among the elements in a different manner than described.

The gaming module 410 executed by the client device 320 provides an interface between a player and the location-based game. The gaming module 410 can present a user interface on a display associated with the client device 320 (e.g., a built-in screen or an AR headset) that displays the virtual world 110 associated with the game and allows the player to interact with the virtual world to perform various game objectives. The gaming module 410 can also control various other outputs to allow a player to interact with the game without requiring the player to view a display screen. For instance, the gaming module 410 can control various audio, vibratory, or other notifications. The gaming module 410 can access game data received from the server 310 to provide an accurate representation of the current state of the virtual world 110 to the player. The gaming module 410 can receive and process player input and provide updates to the virtual world 110 to the server 310 over the network 370.

The positioning subsystem 420 monitors the position of the client device 320. The positioning subsystem 420 can be any device or circuitry for monitoring the position of the client device 320. For example, the positioning subsystem 420 can determine actual or relative position by using a satellite navigation positioning system (e.g., a GPS system, a Galileo positioning system, the Global Navigation satellite system (GLONASS), the BeiDou Satellite Navigation and Positioning system, etc.), an inertial navigation system, a dead reckoning system, by using triangulation or proximity to cellular towers or WiFi hotspots, or other suitable techniques. The position information can be provided on condition of anonymity to protect the privacy of the player. Additionally or alternatively, the positioning subsystem 420 may include a visual positioning system that determines the location and, optionally, orientation (collectively "pose") of the client device 320 by comparing images captured by one or more cameras to a 3D map of the environment of the client device. For example, a coarse location may be determined using GPS, and the positioning subsystem 420 may retrieve a 3D map based on the coarse location, with visual positioning then being used to determine a more precise location (and optionally orientation) of the client device.

As the player moves around with the client device 320 in the real world, the positioning subsystem 420 tracks the position of the player and provides player location data to the gaming module 410. The gaming module 410 updates the player's position in the virtual world 110 based on the position of the player in the real world 100. In particular, the location of the player in the virtual world 110 can correspond to the location of the player in the real world 100 (as described previously, with reference to FIG. 1). When the player is playing the game, the gaming module 410 can provide player location data to the server 310 over the network 370 such that the universal gaming module 510 may keep track of player positions throughout the game.

The location reporting module 430 enables the location of the client device 320 to be reported to the server 310 when the player is not actively playing the game. In one embodiment, location reporting module 430 initiates a background process that monitors the location of the client device 320. The background process may be initiated in response to the player turning on a feature within the game to provide background tagging of virtual elements. The player may be notified that this feature will cause their location to be provided to the server 310 and allow the player to opt out or disable the feature.

Assuming the feature is enabled, the background process updates the server 310 with the player's current location if one or more criteria are met. For example, when the user closes or defocuses the game on their client device 320, the location reporting module 430 may provide the server 310 with the current location of the client device 320. In another example, the current location of the client device 320 is reported when the client device 320 is rebooted. The background process may periodically compare the location of the client device 320 to the previous location provided by the server 310. If the location has sufficiently changed (e.g., the location has changed by at least a threshold amount or the user has left a ring-fenced area that included the previous location), then the location reporting module 430 provides an updated location to the server 310. Alternatively, a current location of the client device 320 is reported to the server 310 after a threshold amount of time has elapsed since a previous location was reported. The server 310 may then use the updated location to make a change in the game, such as tagging one or more virtual elements (e.g., creatures or items) in proximity to the client device's current location with which the user can later interact remotely.

In one embodiment, the location reporting module 430 instantiates a persistent background process that can survive application restart and device reboot. The persistent background process is configured to report the location of the client device no more than every X minutes (e.g., in a range from one to ten minutes), if the device has moved at least Y meters since the last update (e.g., in a range from five to one hundred meters), or if both conditions are met. Limiting the number of updates by time may prevent excessive battery drain by waking up the device to send updates frequently when the device is moving at a high speed (e.g., in a car, train, or plane). Conversely, the limit on update based on change in position prevents unnecessary battery drain by sending multiple updates indicating the same or substantially the same location. In some embodiments, if sensor data indicates the device is not moving, location updates may not be considered at all and once sensor data indicates the device is moving, the device may begin periodically determining whether the device has travelled a sufficient distance since the previous update to provide an updated location.

The foreground tagging module 440 provides a user interface that enables players to tag virtual elements while playing the game (i.e., while the game is in the foreground on the player's client device 320). In one embodiment, when the player is within a threshold distance (e.g., forty meters) of a virtual element, the player may select (e.g., tap or click on) the virtual element and be presented with option to interact with the virtual element now or tag it for future interaction. For example, if the virtual element is a powerful creature the player wants to fight, the player could tag it to fight at a later time when the player has more powerful equipment or more other players of the game to team up with them.

Regardless of exactly how virtual elements are tagged, the gaming module 410 enables the player to interact with tagged virtual elements remotely. In one embodiment, a player may access a list of all tagged virtual elements within the game and select one or more to interact with. Alternatively, virtual elements that were tagged by the background process may be presented in a separate list than those tagged manually in the foreground. For interactions with tagged virtual elements, the player's current location may be irrelevant. Thus, the player may interact with virtual elements that they were previously in proximity to remotely without having to return to the location of the virtual element. Tagged virtual elements may remain tagged for a predetermined period of time or may be tagged until the player interacts with the virtual element or manually detags it. In some embodiments, the server 310 limits the number of virtual elements that may remain stored in association with a given user or limits the number of virtual elements that may be tagged (using the background and foreground tagging processes) per a specified time period. For example, a user may be limited to three virtual elements tagged per day and eight virtual elements stored at a given time. In some embodiments, the limits are initially set to default amounts but are adjustable, e.g., in response to user selection. Additionally or alternatively, a user may be limited to having no more than a threshold number of virtual elements (e.g., three to nine) tagged at any given time with a slot to tag a new virtual element opening up as soon as a previously tagged virtual element is detagged (either through expiration of a timer, user interaction with the virtual element, or manual detagging).

The notification module 450 presents information relating to the parallel-reality game on one or more user interfaces of the client device 320. In one embodiment, the notification module 450 receives push notifications from the server 310 when a virtual element is tagged. Thus, the player may be notified that they are currently in proximity with the virtual element and choose to interact with it immediately. This may be desirable, for example, where there is a limit on the number of virtual elements that may be tagged at the same time, enabling the player to reserve their virtually tagged elements for important of rare virtual elements. Additionally or alternatively, the notifications module 450 may periodically (e.g., daily) generate notifications to players of the number of tagged virtual elements they currently have or to notify them when they have tagged a maximum number of virtual items to encourage the players to open the game and interact with some or all of the tagged virtual elements or manually detag one or more virtual elements.

The local data store 460 is one or more computer-readable media configured to store data used by the client device 320. For example, the local data store 460 may store a local copy of the current state of the parallel-reality game, a local list of virtual elements that have been tagged by the player, or any other appropriate data. Although the local data store 460 is shown as a single entity, the data may be split across multiple media. Furthermore, data may be stored elsewhere (e.g., in a distributed database) and accessed remotely via the network 370.

Example Server

Figure 5:
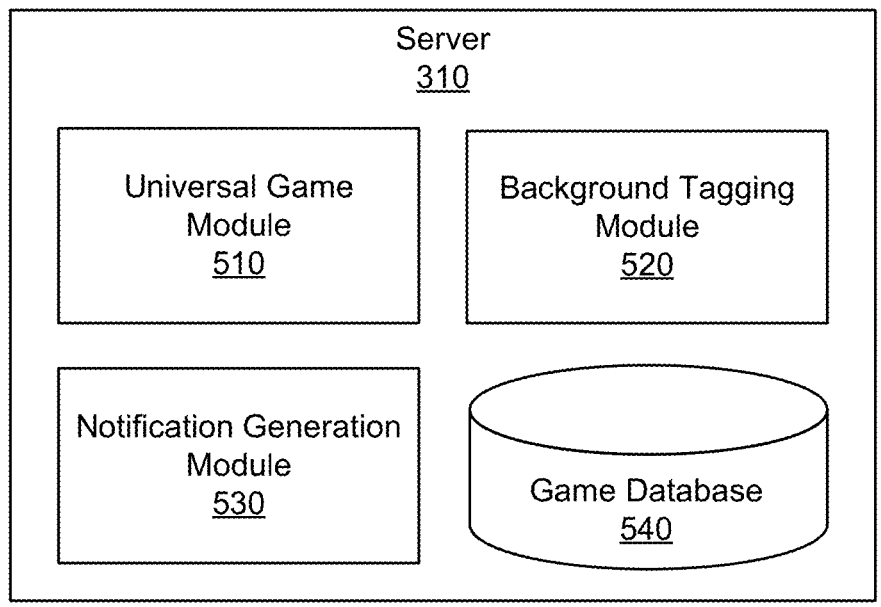
FIG. 5 is a block diagram of the server shown in FIG. 3, according to one embodiment.

FIG. 5 illustrates one embodiment of the server 310 suitable for hosting a location-based parallel-reality game. In the embodiment shown, the server 310 includes a universal game module 510, a background tagging module 520, a notification generation module 530, and a game database 540. In other embodiments, the server 310 contains different or additional elements. In addition, the functions may be distributed among the elements in a different manner than described.

The server 310 can be configured to receive requests for game data from one or more clients 320 (for instance, via remote procedure calls (RPCs)) and to respond to those requests via the network 370. For instance, the server 310 can encode game data in one or more data files and provide the data files to the client 320. In addition, the server 310 can be configured to receive game data (e.g., player positions, player actions, player input, etc.) from one or more clients 320 via the network 370. For instance, the client device 320 can be configured to periodically send player input, player location, and other updates to the server 310, which the server 310 uses to update game data in the game database 540 to reflect changed conditions for the game.

The universal game module 510 hosts the location-based game for players and acts as the authoritative source for the current status of the location-based game. The universal game module 510 receives game data from client devices 320 (e.g., player input, player position, player actions, player status, landmark information, etc.) and incorporates the game data received into the overall location-based game for all players of the location-based game. The universal game module 510 can also manage the delivery of game data to the clients 320 over the network 370.

The universal game module 510 may issue tokens authorizing processes executing on the client devices 320 to access functionality provided by the server 310. The tokens may be valid for a specified length of time after generation (e.g., one hour, one day, seven days, thirty days, etc.). In one embodiment, when a player logs into the location-based game, the universal game module 510 generates a token for the background process used to provide location data and sends it to the player's client device 320. The background process token may be valid for an extended period of time (e.g., thirty days) to enable the background process to continue providing location data, even if the player is not playing the game. Each time the player launches the game, the universal game module 510 may reinitialize the background process token or issue a new token to restart the time period.

In some embodiments, the universal game module 510 handles interactions between players and virtual elements. Multiple players may collaboratively interact with the same game element. For example, a first player may request assistance battling a monster (e.g., by sharing a QR code to other players in the same geographic area), and the other players may offer to provide assistance and engage in a collaborative battle with the monster. In one embodiment, all players in a geographic area see the same monsters on a map (e.g., monsters A, B, and C). When Player A wants companions for battling monster A, player A requests help. All players nearby see player A's request for the battle with monster A. If more than a maximum number of (e.g., three) players try to join player A's battle, the first set of players up to the threshold number join player A's battle, and any remaining players get placed into new battles with monster A in groups up to the maximum group size (the threshold number of assisting players plus one). If multiple players ask for help with monster A, the requests may be grouped into one rather than creating multiple battles, each with less than the maximum number of players in it. Thus, if there are a large number of players (e.g., one thousand) all requesting help, the requests are grouped by monster, and the total number of requests becomes the number of monsters being battled by at least one player instead of the total number of players, with the players requesting to battle the same monster being divided into groups of up to the maximum groups size based on one or more criteria. In the example described, the criteria are simply the order in which players indicate a desire to battle the monster, but other criteria may be used, such as affinity between the players, distance between the players, player preferences, player teams or factions, player level, and the like.

In various embodiments, the background tagging module 520 is a part of or separate from the universal game module 510. The background tagging module 520 is configured to receive location data from a client device 320 and tag one or more virtual elements based on the received location data. In one embodiment, the background tagging module 520 receives a location of the client device 320 and identifies a region around the client device 320. The region may be a circular region of predetermined radius centered on the location of the client device 320, another shape (e.g., a square of predetermined side length) centered on the current location, or a preexisting ring-fenced area (e.g., an S2 cell) that includes the current location, etc.

The background tagging module 520 determines whether any taggable virtual elements are within the identified region. A virtual element may be taggable if it is of a type that is defined as taggable (e.g., in the game database 540). Thus, some virtual element types (e.g., monsters) may be taggable while others (e.g., power ups) may not. Assuming there is at least one taggable virtual element within the identified region, one or more of the virtual elements are tagged by the player. Tagging may include adding an identifier of the player in conjunction with an identifier of the virtual element to a table in the game database 540.

In various embodiments, elements taggable via the background tagging process are the same or different from elements taggable using the foreground process. For example, in some implementations, different virtual elements are available for background tagging than those that a user may manually tag while the application is open and in the foreground of the client device 320. Accordingly, a user may be incentivized to use the background tagging process to obtain virtual elements (e.g., weapons, creatures) that would not otherwise be available in the location-based game.

If the identified region includes more than one taggable virtual element, various approaches may be used to determine which virtual element or elements to tag. In one embodiment, the background tagging module 520 tags one or more taggable virtual elements closest to the player. In another embodiment, the background tagging module 520 tags one or more most valuable or rarest taggable virtual elements (e.g., as defined by a rareness of value score in the game database 540). In another embodiment, the background tagging module 520 selects one or more taggable virtual elements randomly. In a further embodiment, the background tagging module 520 tags all of the taggable virtual elements. In still further embodiments, a user may provide input regarding one or more parameters for the background tagging module 520 to use in selecting which virtual elements to tag (e.g., to tag a first type of virtual element but not a second, to tag virtual elements having greater than a specified rareness of value score, to tag only virtual elements in a specified geographic area, etc.). As described previously, the server 310 receives locations from the client device 320 when the client device 320 moves. So, regardless of precisely how virtual elements are selected for tagging, a player can tag additional virtual elements by moving through world without having to have the game open on their client device 320.

The notification generation module 530 generates and sends notifications to players' client devices 320 based on the tagged virtual elements. As described previously, with reference to FIG. 4, notifications may be generated under various circumstances. For example, a notification may be generated when a player tags a virtual element, when a player tags a virtual element with at least a predetermined rarity or value, when a player tags a virtual element of a type that the player has previously expressed interest in (e.g., in game settings), when the player has tagged a predetermined number of virtual elements (e.g., a maximum number of virtual elements), or when a tagging of a virtual element is within a threshold amount of time (e.g., one hour) of expiring, etc. Alternatively, a notification is generated and sent to a client device 320 on a periodic basis (e.g., daily at a default time or a time selected by the user).

The game database 540 includes one or more machine-readable media configured to store game data used in the location-based game to be served or provided to client devices 320 over the network 370. The game data stored in the game database 540 can include: (1) data associated with the virtual world in the location-based game (e.g., image data used to render the virtual world on a display device, geographic coordinates of locations in the virtual world, etc.); (2) data associated with players of the location-based game (e.g., player information, player experience level, player currency, player inventory, current player positions in the virtual world/real world, player energy level, player preferences, team information, etc.); (3) data associated with game objectives (e.g., data associated with current game objectives, status of game objectives, past game objectives, future game objectives, desired game objectives, etc.); (4) data associated virtual elements in the virtual world (e.g., positions of virtual elements, types of virtual elements, game objectives associated with virtual elements, corresponding actual world position information for virtual elements, behavior of virtual elements, relevance of virtual elements, etc.); (5) data associated with real world objects, landmarks, positions linked to virtual world elements (e.g., location of real world objects/landmarks, description of real world objects/landmarks, relevance of virtual elements linked to real world objects, etc.); (6) game status (e.g., current number of players, current status of game objectives, player leaderboard, etc.); (7) data associated with player actions/input (e.g., current player positions, past player positions, player moves, player input, player queries, player communications, etc.); (8) identifiers of virtual elements in conjunction with player identifiers indicating the virtual elements have been tagged by the players; and (9) any other data used, related to, or obtained during implementation of the location-based game. The game data stored in the game database 540 can be populated either offline or in real time by system administrators or by data received from players, such as from one or more client devices 320 over the network 370.

The game database 540 may also store real-world condition data. The real-world condition data may include the aggregate locations of players in the real world; player actions associated with locations of cultural value or commercial value; map data providing the locations of roads, highways, and waterways; current and past locations of individual players; hazard data; weather data; event calendar data; activity data for players (e.g., distance travelled, minutes exercised, etc.); and other suitable data. The real-world condition data can be collected or obtained from any suitable source. For example, the game database 540 can be coupled to, include, or be part of a map database storing map information, such as one or more map databases accessed by a mapping service. As another example, the server 310 can be coupled to one or more external data sources or services that periodically provide population data, hazard data, weather data, event calendar data, or the like.

Example Ringfence Configuration

Figure 6:
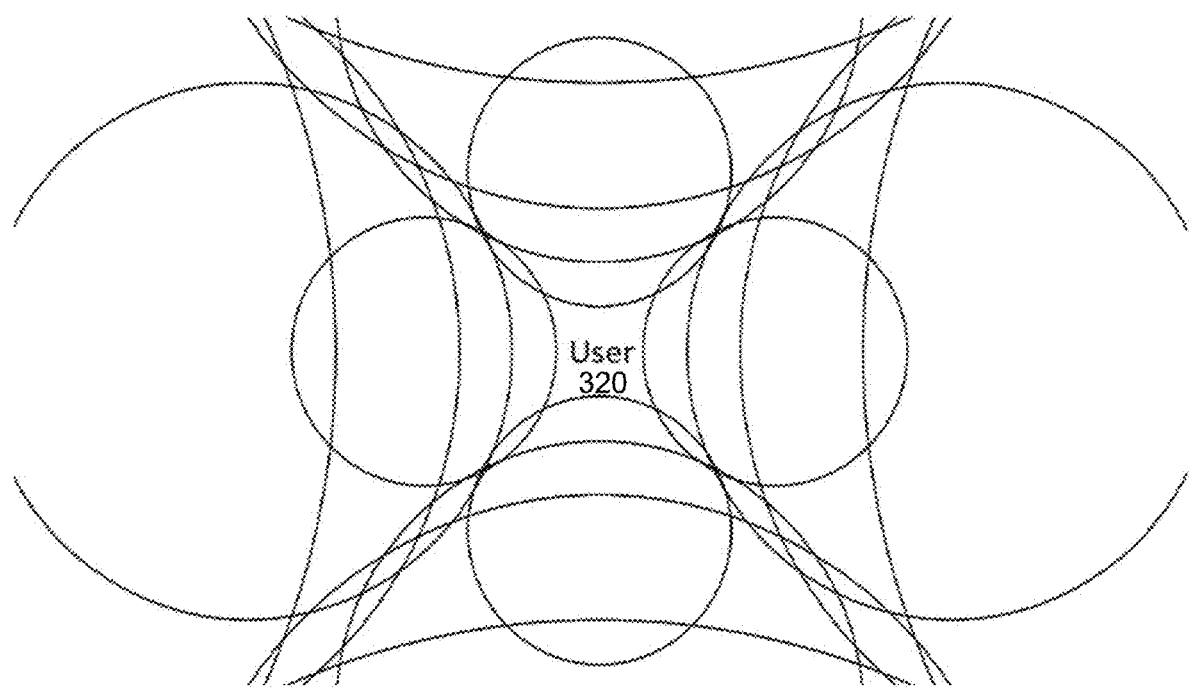
FIG. 6 illustrates an example configuration of ringfences around a user, according to one embodiment.

FIG. 6 illustrates an example configuration of ringfences around a user, according to one embodiment. As discussed above, in some embodiments, when a location update is provided from a client device 320, the location reporting module 430 sets up one or more geofences around the provided location that can be used to determine when to trigger the next tagging operation. For example, in the configuration illustrated in FIG. 6, the user (e.g., the client device 320) is positioned at a center of the configuration, while circular (or other shaped) geofences are placed centered a predetermined set of distances in each cardinal direction from the user (e.g., 25, 50, 80, and 150 meters North, South, East, and West of the user). When the location reporting module 430 determines that the client device 320 has entered any of these geofenced regions, the parallel-reality application may wake up and provide an updated location to the server 310.

Which geofence or geofences have been entered may impact what updates are provided for the parallel-reality application. For example, the server 310 may provide application data for the geographic region encompassed within the largest geofence entered by the client device 320. Thus, if the client device has traveled further (e.g., because it is moving more quickly) the server 310 will provide application data for a larger region than if the client device 320 has traveled a shorter distance (e.g., because it is moving slowly).

Example Methods

Figure 7:
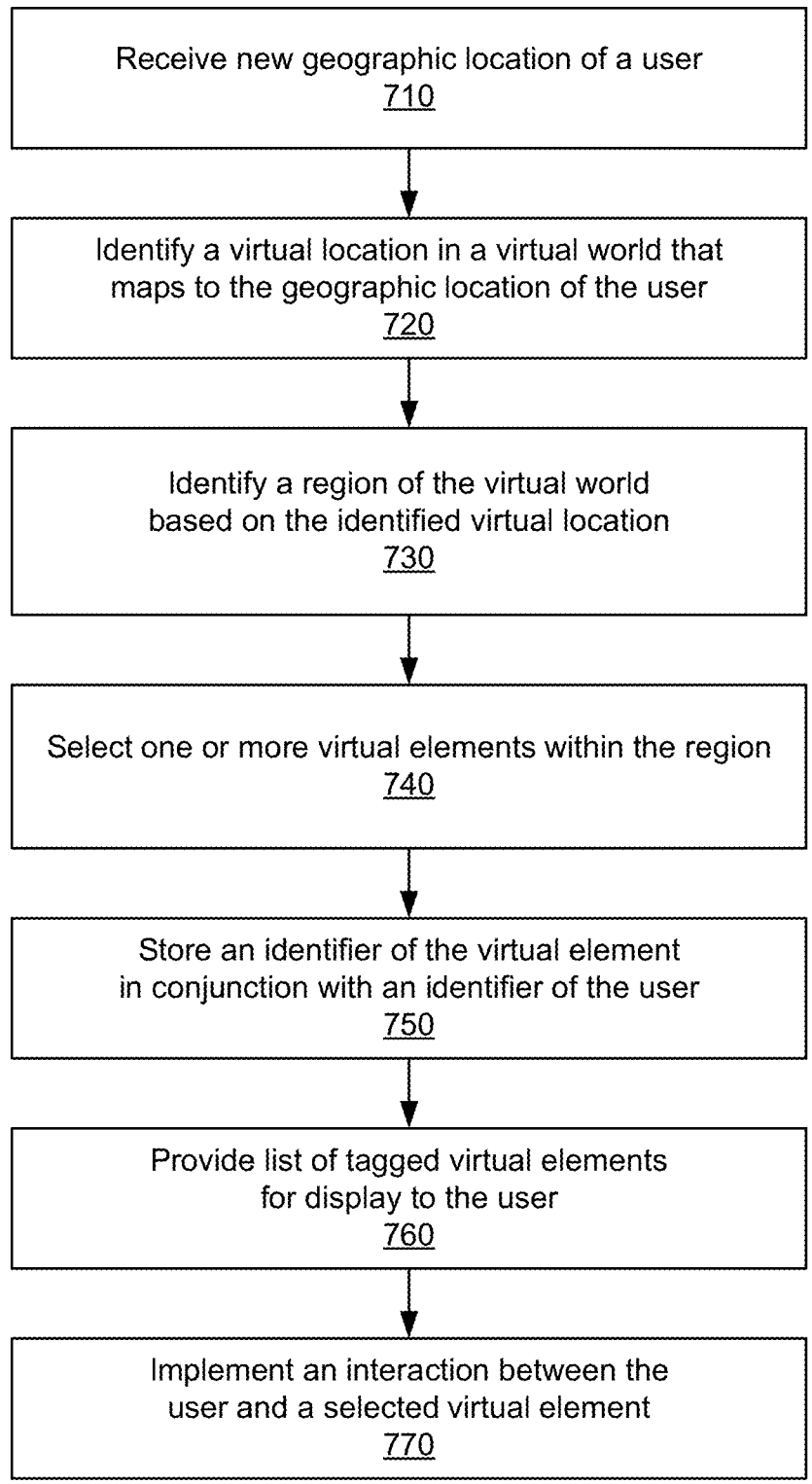
FIG. 7 is a flowchart of a process for tagging and remotely interacting with virtual elements, according to one embodiment.

FIG. 7 is a flowchart describing an example method 700 for tagging and remotely interacting with virtual elements in a parallel-reality application, according to one embodiment. The steps of FIG. 7 are illustrated from the perspective of the server 310 performing the method 700. However, some or all of the steps may be performed by other entities or components. In addition, some embodiments may perform the steps in parallel, perform the steps in different orders, or perform different steps.

In the embodiment shown, the method 700 begins with the server 310 receiving 710 a new geographic location of the user. The geographic location of the user can be a location of the user's client device 320 that is sent to the server when the client device 320 has moved a significant distance since a last location update or if a threshold amount of time has passed since a previous location was reported to the server 310. The location may be provided by a background process when the parallel-reality application is not active (e.g., running only in the background or not running at all) on the user's client device 320.

The server 310 identifies 720 a virtual location in the virtual world that maps to the geographic location of the user. As described previously, in a parallel-reality application, the virtual world has a coordinate system that maps to a coordinate system of the real world such that the user can navigate the virtual world by moving around in the real world. The server 310 also identifies 730 a region of the virtual world based on the user's location in the virtual world. For example, the region may be a circle or other shape centered on the user's location or a predefined ringfenced region that incorporates the user's location.

The server 310 selects 740 one or more virtual elements within the region for the user to tag. In one embodiment, the server 310 selects one virtual element to tag. If multiple virtual elements are available, the server 310 may select 740 based on proximity to the user, value or rarity of the virtual element, user preferences, randomly, or using any other suitable criteria. The server 310 stores 750 an identifier of the selected virtual element (or elements) in conjunction with an identifier of the user (e.g., in the game database 540) to indicate that the user has tagged the virtual element.

At a later time (e.g., when the user is actively using the parallel-reality application), the server 310 provides 760 a list of tagged virtual elements (including the virtual element selected 740) for display to the user. The user selects one of the listed virtual elements and the server 310 implements 770 an interaction between the user and the virtual element. For example, the user may claim, capture, battle, recharge, repair, or communicate with the selected virtual element without being in proximity to the selected virtual element. After the user has interacted with the virtual element, the tag is removed.

Example Computing System

Figure 8:
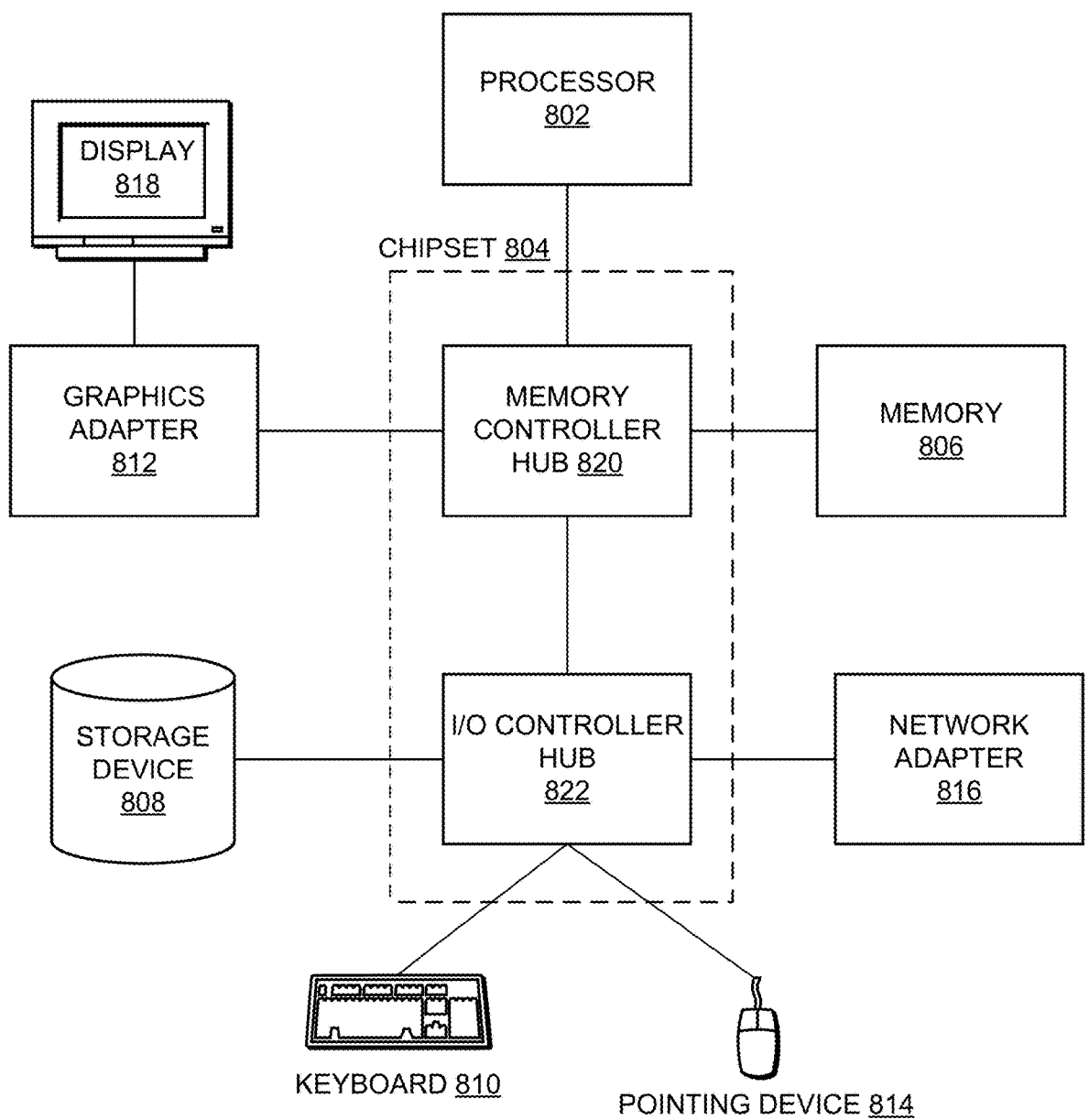
FIG. 8 illustrates an example computer system suitable for use in the networked computing environment of FIG. 1, according to one embodiment.

FIG. 8 is a block diagram of an example computer 800 suitable for use as a client device 320 or server 310. The example computer 800 includes at least one processor 802 coupled to a chipset 804. References to a processor (or any other component of the computer 800) should be understood to refer to any one such component or combination of such components working cooperatively to provide the described functionality. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touchscreen, or other type of pointing device, and may be used in combination with the keyboard 810 (which may be an on-screen keyboard) to input data into the computer system 800. The graphics adapter 812 displays images and other information on the display 818. The network adapter

816 couples the computer system 800 to one or more computer networks, such as network 370.

The types of computers used by the entities of FIGS. 3 through 5 can vary depending upon the embodiment and the processing power required by the entity. For example, the server 310 might include multiple blade servers working together to provide the functionality described. Furthermore, the computers can lack some of the components described above, such as keyboards 810, graphics adapters 812, and displays 818.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method comprising:
   receiving a geographic location of a user;
   identifying a virtual location, in a virtual world, that maps to the geographic location of the user;
   identifying a region of the virtual world based on the identified virtual location;
   selecting a virtual element within the region of the virtual world, wherein the virtual element is of a type defined as taggable via a background tagging process and wherein at least one other type of virtual element is of a type defined as not taggable via the background tagging process;
   storing an identifier of the virtual element in conjunction with an identifier of the user to indicate the virtual element is tagged;
   providing a list of tagged virtual elements for display to the user, the tagged virtual elements including the virtual element; and
   implementing an interaction between the user and a selected one of the tagged virtual elements.

2. The computer-implemented method of claim 1, further comprising:
   receiving an updated geographic location of the user, the updated geographic location indicating that the user has moved more than a threshold distance from the geographic location;
   selecting an additional virtual element in proximity of the updated geographic location; and
   storing an identifier of the additional virtual element in conjunction with the identifier of the user, wherein the list of tagged virtual elements further includes the additional virtual element.

3. The computer-implemented method of claim 1, further comprising:
   receiving an updated geographic location of the user, the updated geographic location indicating that the user has moved to a different region of the virtual world;
   selecting an additional virtual element within the different region of the virtual world; and
   storing an identifier of the additional virtual element in conjunction with the identifier of the user, wherein the list of tagged virtual elements further includes the additional virtual element.

4. The computer-implemented method of claim 1, wherein the geographic location of the user is received from the background tagging process to monitor a location of a user client device that operates while an application associated with the virtual elements is not in focus on the user client device.

5. The computer-implemented method of claim 4, wherein virtual elements taggable via the background tagging process are different from virtual elements taggable via a foreground tagging process.

6. The computer-implemented method of claim 1, wherein the virtual element is one of a plurality of virtual elements in the region that are selected, and an identifier for each of the plurality of virtual elements is stored in conjunction with the identifier of the user.

7. The computer-implemented method of claim 1, wherein the virtual element is selected based on one or more of proximity to the user, value or rarity of the virtual element, or user preferences, or is selected randomly.

8. The computer-implemented method of claim 1, further comprising responsive to determining that the interaction between the user and the selected one of the tagged virtual elements has concluded, removing the identifier of the selected one of the tagged virtual elements from being stored in conjunction with the identifier of the user.

9. The computer-implemented method of claim 1, further comprising responsive to storing the identifier of the virtual element in conjunction with the identifier of the user, sending a notification to the user.

10. A non-transitory computer-readable storage medium comprising instructions executable by a processor, the instructions executable to perform operations comprising:
receiving a geographic location of a user;
identifying a virtual location, in a virtual world, that maps to the geographic location of the user;
identifying a region of the virtual world based on the identified virtual location;
selecting a virtual element within the region of the virtual world, wherein the virtual element is of a type defined as taggable via a background tagging process and wherein at least one other type of virtual element is of a type defined as not taggable via the background tagging process;
storing an identifier of the virtual element in conjunction with an identifier of the user to indicate the virtual element is tagged;
providing a list of tagged virtual elements for display to the user, the tagged virtual elements including the virtual element; and
implementing an interaction between the user and a selected one of the tagged virtual elements.

11. The non-transitory computer-readable storage medium of claim 10, wherein the operations further comprise:
receiving an updated geographic location of the user, the updated geographic location indicating that the user has moved more than a threshold distance from the geographic location;
selecting an additional virtual element in proximity of the updated geographic location; and
storing an identifier of the additional virtual element in conjunction with the identifier of the user, wherein the list of tagged virtual elements further includes the additional virtual element.

12. The non-transitory computer-readable storage medium of claim 10, wherein the operations further comprise:
receiving an updated geographic location of the user, the updated geographic location indicating that the user has moved to a different region of the virtual world;
selecting an additional virtual element within the different region of the virtual world; and
storing an identifier of the additional virtual element in conjunction with the identifier of the user, wherein the list of tagged virtual elements further includes the additional virtual element.

13. The non-transitory computer-readable storage medium of claim 10, wherein the geographic location of the user is received from the background tagging process to monitor a location of a user client device that operates while an application associated with the virtual elements is not in focus on the user client device.

14. The non-transitory computer-readable storage medium of claim 13, wherein virtual elements taggable via the background tagging process are different from virtual elements taggable via a foreground tagging process.

15. The non-transitory computer-readable storage medium of claim 10, wherein the virtual element is one of a plurality of virtual elements in the region that are selected, and an identifier for each of the plurality of virtual elements is stored in conjunction with the identifier of the user.

16. The non-transitory computer-readable storage medium of claim 10, wherein the virtual element is selected based on one or more of proximity to the user, value or rarity of the virtual element, or user preferences, or is selected randomly.

17. The non-transitory computer-readable storage medium of claim 10, wherein the operations further comprise responsive to determining that the interaction between the user and the selected one of the tagged virtual elements has concluded, removing the identifier of the selected one of the tagged virtual elements from being stored in conjunction with the identifier of the user.

18. The non-transitory computer-readable storage medium of claim 10, wherein the operations further comprise responsive to storing the identifier of the virtual element in conjunction with the identifier of the user, sending a notification to the user.

* * * * *